United States Patent [19]
Barth et al.

[11] Patent Number: 5,778,758
[45] Date of Patent: Jul. 14, 1998

[54] LINEARLY GUIDED LONGITUDINAL DISPLACEMENT SYSTEM WITH A COVER TAPE

[75] Inventors: Waldemar Barth, Weil-Breitenstein; Uwe Schön, Echterdingen; Andreas Kec, Dettenhausen; Martin Christmann, Reutlingen, all of Germany

[73] Assignee: NEFF Antriebstechnik Automation GmbH

[21] Appl. No.: 799,621

[22] Filed: Feb. 12, 1997

[30] Foreign Application Priority Data

Feb. 14, 1996 [DE] Germany ............... 196 05 387.0

[51] Int. Cl.⁶ ................................................. F01B 29/00
[52] U.S. Cl. ................................. 92/88; 277/DIG. 7
[58] Field of Search ....................... 92/88; 277/DIG. 7

[56] References Cited

U.S. PATENT DOCUMENTS

| | | | |
|---|---|---|---|
| 4,685,383 | 8/1987 | Ruchser | 92/88 |
| 4,829,881 | 5/1989 | Taki et al. | 92/88 |
| 4,991,494 | 2/1991 | Migliori | |
| 5,517,901 | 5/1996 | Lipinski | 277/DIG. 7 |

FOREIGN PATENT DOCUMENTS

| | | |
|---|---|---|
| 104 304 A | 4/1984 | European Pat. Off. |
| 31 24 878 | 12/1982 | Germany. |
| 43 34 311 | 4/1995 | Germany. |
| 857 715 | 1/1961 | United Kingdom. |

*Primary Examiner*—Thomas E. Denion
*Attorney, Agent, or Firm*—Frishauf, Holtz, Goodman, Langer & Chick, P.C.

[57] ABSTRACT

To reliably seal an elongated slit (8) passing through an essentially tubular guide body (6) against contamination by dirt, machine cutting chips and the like, while permitting passage of a movable projecting element through the slit, a cover tape (14) is placed over the slit, but removable therefrom. The cover tape (14) is locked to the guide body (6) by a releasable locking arrangement which includes interengaging, interlocking projection (26) and recess (35) means, located at the sides of the tape (14) on the guide body (6), respectively. The projection means is formed by a headed elongated rib (27), preferably located on the guide body, and the recess means (35) are formed by a groove between a pair of laterally deflectable lips (36, 37), which can snap over the head portion (28) of the rib for positive engagement, while requiring only little force to lift them off the head portion. The locking arrangement for the tape (14) is located on both sides of the tape, so that the region of the slit itself is free from forces arising in locking and unlocking of the tape. Thus, the tape can be formed to be soft and supple.

20 Claims, 5 Drawing Sheets

LINEARLY GUIDED LONGITUDINAL DISPLACEMENT SYSTEM WITH A COVER TAPE

Reference to related patent and applications, the disclosures of which are hereby incorporated by reference:

U.S. Pat. No. 4,991,494, Migliori;

U.S. application Ser. No. 08/566,793, filed Dec. 4, 1995, Schon, now U.S. Pat. No. 5,690,431, assigned to the assignee of the present application, U.S. application Ser. No. 08/799,620 filed, Feb. 12, 1997, Barth et al., assigned to the assignee of the present application,
Reference to related patent publication:

German 43 34 311, Desbree.

FIELD OF THE INVENTION.

The present invention relates to a linearly guided system to provide for longitudinal displacement of a displacement element, such as a carriage, which is guided on a predetermined path.

BACKGROUND.

Linear displacement systems are used in technology for various purposes, for example as linear bearings, linear displacement drive systems, sensors or sensing systems to measure displacement, or the like. The guide system, usually, includes a guide tube which is formed with a longitudinal slit through which a portion of a longitudinally movable element can project. Usually, the longitudinal slit is covered by a band or tape to prevent contamination of the interior of the tube. In the region of a force transfer, or measuring sensing element, the tape or band or ribbon is lifted off the longitudinal slit to permit passage of the sensing element therethrough.

Usually, the slit is straight, so that the linear element, and with it the force transmitting, or sensing linearly movable portion moves along a longitudinal axis. In some other arrangements, however, the force transfer element, or sensing can also pivot about the axis of the tube; the slit is then convexly curved.

The tape or ribbon or cover band is provided to cover the slit outside of the region of the force, or sensing element to be as dust—and contaminant-proof as possible. Penetration of dirt, moisture, cut chips from machine tools, or the like, should be prevented from passing through the slit into the interior of the tube, and hence in the guide region of the guide body. The cover tape must be held reliably and tightly against the slit; it must, however, be so arranged that it releases the slit in the region of the outwardly projecting force-transmitting or sensing portion. It is desirable that the cover tape does not interfere with movement of the movable element, and its projecting portion, or at least only minimally interferes with such movement.

It is an additional requirement in linearly guided systems that the cover tape has a long life and provides for reliable sealing in order to prevent premature malfunction of the longitudinally guided system.

U.S. Pat. No. 4,991,494, Migliori, describes a pneumatic linear drive cylinder which has a longitudinally slit cylinder body in which a reciprocating piston slides. The piston is coupled by a rib with a slider carriage located at the outside of the cylinder. The longitudinal slit is covered from the inside with a sealing strip which is engaged at both sides of the piston in recesses of the cylinder wall. The outside of the longitudinal slit is covered with a steel reinforced cover tape which is essentially in flat form and which, further, has two longitudinal ribs for interengagement with longitudinal grooves formed in the cylinder tube, and positioned adjacent the slit. Each one of the engagement strips is laterally biased and engages in a groove which has an undercut portion. The engagement pressures of the two strips are oppositely directed and are transferred between each other from the portion of the cover tape which spans the longitudinal slit.

To obtain good adhesion of the cover tape to the cylinder, the cover tape is stiffened with a steel reinforcement which is relatively thick.

THE INVENTION.

It is an object to provide a linearly guided system which has a cover tape over a slit in a longitudinal tubular element and which, reliably and over long operating time and many operating cycles, covers the longitudinal slit while, at the same time, not, or hardly at all, interfering with movement of an outwardly projecting element or portion of the movable element.

Briefly, the cover tape, as well as the guide tube, is formed with an interengaging, interfitting elongated lock. The lock is constituted by two elongated ribs located parallel to the slit and having an enlarged head portion which can snap between two longitudinal lips, spaced from each other and having a narrowed entrance slot. Thus, the tape can snap over the enlarged head of the rib. Preferably, the lips are located on the tape, and the rib, with the enlarged head, is part of the guide tube which, for example and preferably, is an aluminum extruded profiled, or shaped tube.

The guide system can be a straight linear guide system, or guide the movable element within the tube in a curved path. The tube itself is formed with a through slit. The movable element is suitably retained within both sides of the longitudinal slit of the guide body. The lock is elongated and retains the cover tape locally in position without force or bias, which is in contrast to the linear drive cylinders in accordance with the prior art. There are no other connecting elements connecting the two sides of the slit. The portion of the cover tape which bridges the longitudinal slit, therefore, can be relatively thin, which means it may be soft, pliable and flexible, so that the cover tape overall has a high degree of flexibility. This substantially facilitates movement of the portion of the movable element projecting through the slit. The cover tape is separated from the guide body, that is, from the guide tube only locally where the projecting portion is positioned, and behind—with respect to movement of the projecting portion thereof—it is again repositioned in the interlocking arrangement with the tube.

In accordance with a feature of the invention, the elongated, interengaging projection-and-recess lock is so arranged that the holding force, which keeps the cover tape on the body or tube is substantial, although the force for unlocking, and relocking, can be small. This ensures reliable retention of the cover tape, once it is in locked position.

The profiled strip locking arrangement permits linear relative movement between the cover tape and the guided element. This also permits to automatically compensate for changes in the length of the cover tape, due to expansion, in use, due to temperature changes and/or wear. The cover tape, at one end, can be automatically tightened if it should become slack. This is particularly of importance when the profile of the coupling element, in longitudinal direction, does not change and coupling elements interengage with only little play, or, even possibly with bias force.

The longitudinal locking arrangement is formed of two locking portions. One is a locking portion or rib, and the other is a groove in which the rib engages. The groove is so dimensioned that the strip or rib is engaged in the groove when it is moved into the groove. The locking half with the rib is preferably located on the longitudinal tube or guide body, and the portion with the groove is formed on the tape. Of course, this arrangement can be reversed in that the rib is formed on the cover tape and the guide body with the respective groove. For operation of the overall system, and particularly of the longitudinal locking arrangement, it is preferred to form two ribs on the guide body and two grooves on the cover tape. The ribs, then will be rigid. The cover tape is formed with flexible lips which, between themselves, define the groove, which lips are, in pairs, interengaged with one rib.

Preferably, the ribs are unitary with the guide body, for example forming one aluminum extruded or pressed rail-like tubular structure.

The cross-section of the ribs preferably is rounded, or formed with a rounded head. This provides self-centering of the profiled lock, when it is to be closed.

DRAWINGS.

DETAILED DESCRIPTION.

Figure 1:
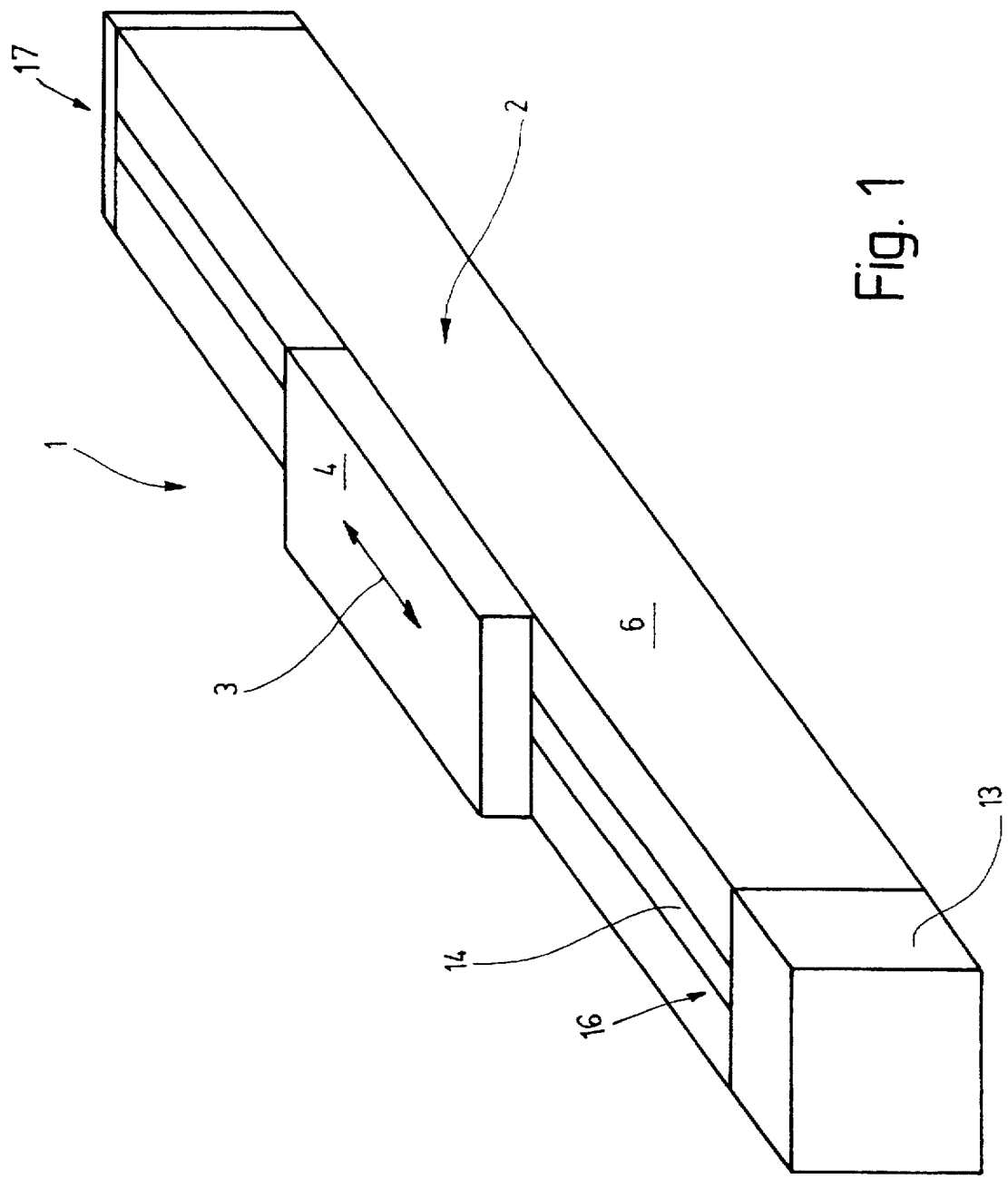
FIG. 1 is a highly schematic perspective view of a linear drive system having a linear guide body, formed with a longitudinal slit covered by a cover tape.
Figure 2:
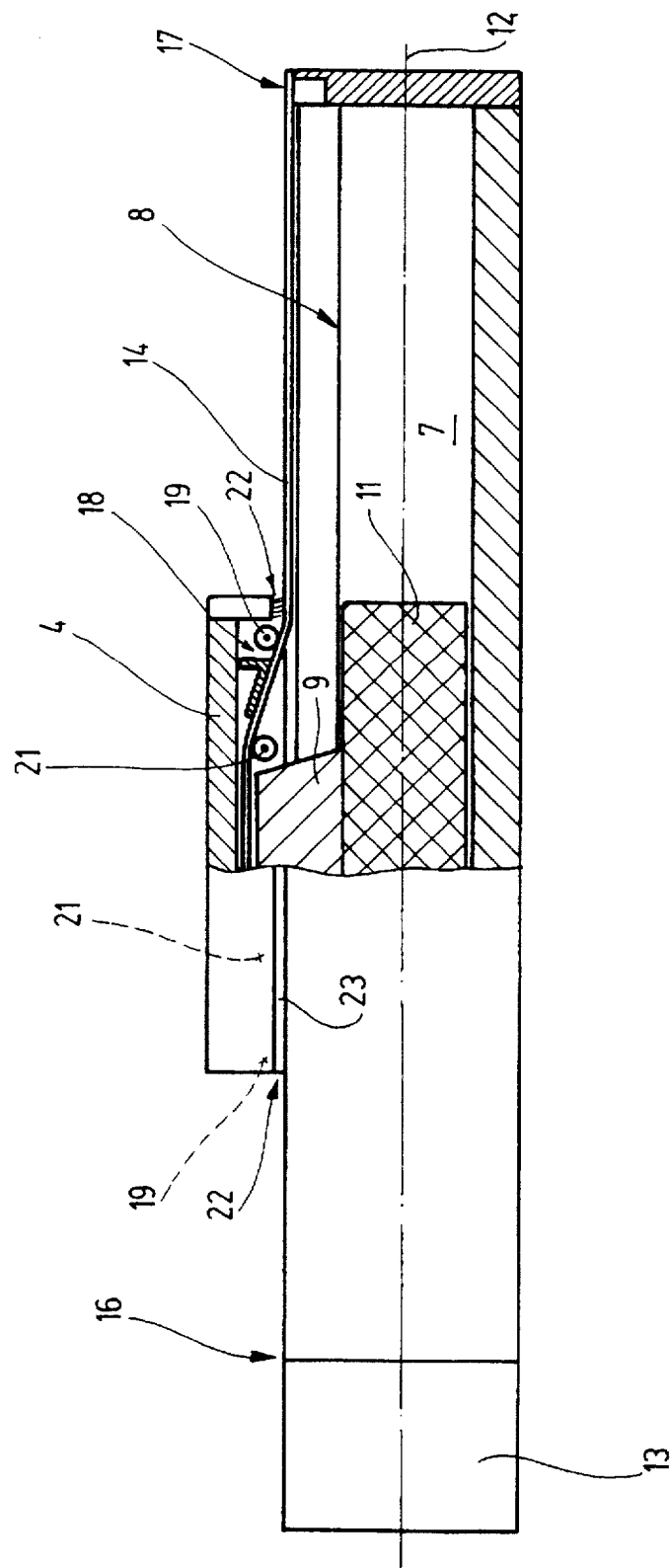
FIG. 2 is a longitudinal side view of the guide body of FIG. 1, in highly schematic representation, partly cut away and shown in section.

Referring first to FIGS. 1 and 2: a linear drive 1 has a guide system 2, typically a tubular structure, along which a carriage 4 can move as schematically shown by the arrow 3. The guide system 2 is illustrated as a linear system which has a body 6 of essentially square cross-section. The body 6 surrounds an interior space 7 (FIG. 2) extending through the linear dimension of body 6. The inner space 7 is accessible to the outside through a slit 8, which extends in longitudinal direction through one of the surfaces of the guide body 6, and through the upper surface thereof.

The carriage 4 has a force transfer, or motion sensing element 9, which forms a portion, or is connected to a drive element 11 (FIG. 2), which is located within the interior 7 of body 6. The transfer element 9 extends through the slit 8 outwardly thereof. The element 11 is coupled through a force or motion transfer arrangement 12 with a drive 13. The arrangement 12 and drive 13 are only schematically indicated, since they can be of any suitable type, for example a threaded spindle, a ball spindle drive, a push-pull cable coupling or any other suitable drive element, to drive the body 11 back and forth, or, if the body 11 is itself driven, provide a sensing output to the unit 13. Consequently, the force or motion transfer arrangement 12 is shown merely as a chain-dotted line coupled to a schematically shown drive, or driven unit 13.

As best seen in FIGS. 1 and 2, the slit 4 is covered towards the outside in regions beyond the carriage 4 by a tape 14. The tape or ribbon or band 14 is held at its ends 16, 17 and extends along the slit 8. It is guided through an axial passage of the carriage 4. Rollers 19, engaging the outer side of the tape 14, guide the tape 14 in its axial passage through the portion 9 of the guided element. Rollers 19 are located adjacent the end faces of the carriage 4.

The tape 14 is separated from the guide body 6 by two rollers 21 engaging the inside of the tape 14. Just as the rollers 19, they are rotatably retained on the carriage 4, transversely to the movement 3 of the carriage 4; their axes of rotation retain them rotatably within the carriage 4.

The axial passage 18 towards the outside is sealed by a brush strip 22, provided on the carriage 4 at each facing end. The brush strip 22 is engaged against the cover tape 14 and the outer flank of the guide body 6. The carriage 4 is laterally sealed by rubber, or plastic extensions or lips 23 which also close off the axial passage 18 and slide with one edge on the outer surface of the guide body 6, when moving in longitudinal direction.

Figure 3:
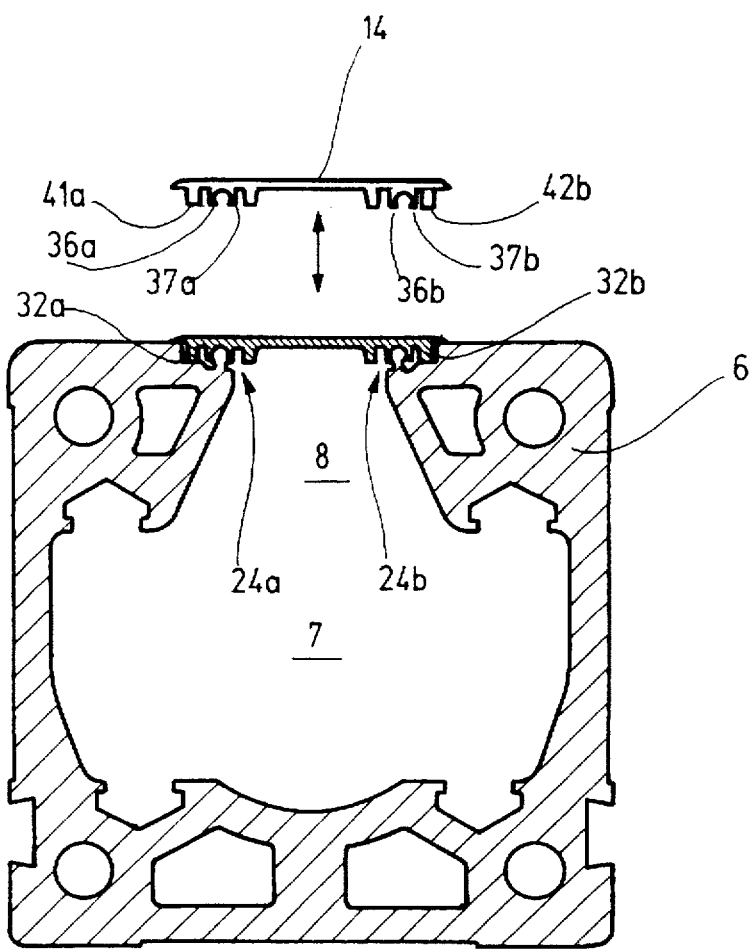
FIG. 3 shows the guide body of FIGS. 1 and 2, in transverse section, with the cover tape both in position on the guide body, and removed therefrom; the cross-sectional view is simplified for ease of representation.
Figure 4:
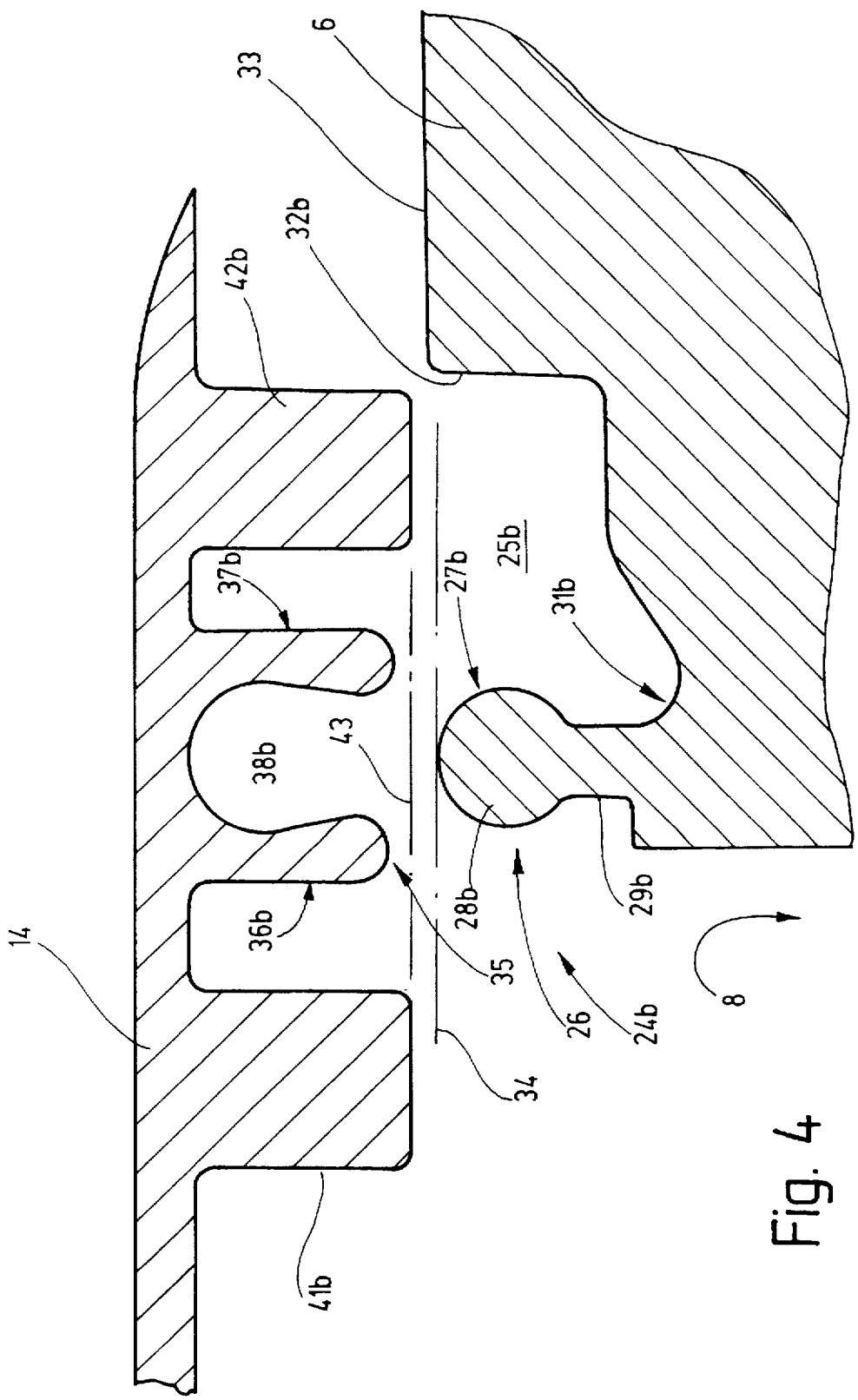
FIG. 4 is a highly enlarged portion of the cross-section of FIG. 3, illustrating one lateral side of the cover tape, and a lateral side of the guide body and showing the interengaging lock.

In accordance with a feature of the present invention, the tape 14, as best seen in FIGS. 3 and 4, is secured to the base body 6 by two longitudinal locks 24a, 24b. The locks 24a, 24b form profile strip locks, and are symmetrically located with respect to a central longitudinal axis of the guide body 6, as well as symmetrical with respect to the slit 8.

FIG. 4 shows, and will be described with respect to the right side of profile strip lock 24b; exactly the same features are correspondingly provided on the profile strip 24a. In the detailed description hereinafter, reference will merely be made to the reference numeral, without subscripts (a, b), since any such references are equally applicable to both respective sides, in some views having the additional subscripts a and b thus, for example, ribs 527 are shown by parts 27a, 27b; groove 31 by grooves 31a, . . . and so on.

The guide body 6 is formed with a longitudinal recess 25 in a region adjacent the slit 8. A rib 27b, unitary with the guide body 6, projects from the recess 25, to form one coupling element 26 of the longitudinal lock 24. The rib 276, in cross-section, has an undercut rail profile with an essentially round head 28. The round head 28 is coupled to the body 6 via the rib 29 which has essentially parallel side surfaces, to form a unitary element with the guide body 6. The rib 29 is narrower than the maximum widths of the head 28.

A groove or recess 31 in the bottom of the general recess 25 is formed adjacent the rib 29, to receive dust, or possible rubbed-off, or abrasion particles. The recess 31 is located at the side of the rib 29, remote from the slit 8 or the locking element 26, respectively. Spaced from the rib 7, the recess 25 forms a side surface 32 which extends at right angle to an outer surface 33 of the base body 6. The space between the locking element 6 and the surface 32 is small; it is used to receive projecting portions of the cover tape 14.

The tape 14 is formed with a locking element 35 complementary to the locking element 36. The locking element 35 is formed by a pair of longitudinal lips 36, 37 (specifically 36a, 36b; 37a, 37b), unitary with the cover tape 14. The lips 36, 37 extend from the tape 37 in an approximately right angle with respect to the remainder of the tape 14, and are parallel to each other, spaced from each other. A longitudinal groove 38 is defined between lips 36, 37, which, generally, has a cross section which corresponds to the outer contour of the rib, or rail 27 on the body 6. The lips 36, 37 are formed with slightly enlarged end portions to engage behind the head 28 of the rib or rail 27, when the tape is locked on the body 6. The lips 36, 37 are so dimensioned that, in locked or snapped-together position, they engage with very slight pressure against the ribs 27. The holding effect, however, is formed by the interengagement. It is also possible to form the coupling elements 26, 35, specifically the rib or rail 27 and the lips 36, 37 in such a way that the lips seat on the rib or rail 27 with slight play, yet engage over and beyond the head 28. Such slight spacement or play permits longitudinal shifting of the cover tape 14 with small axial force, which is highly desirable for later tightening of the cover tape 14.

The locking elements 35 on the tape, that is, the lips 36, 37, are protected on both sides by projecting ribs 41, 42. Ribs 41, 42 have essentially rectangular cross-section, and they extend perpendicularly downwardly farther from the cover tape 14 than the lips 36, 37. The ends facing the guide body 6 of the lips 36, 37 define a plane 43 which is not reached by the lips 36, 37. The longitudinal ribs 41, 42 additionally provide for longitudinal stiffening of the tape 14, and as engagement surfaces for the rollers 21 (FIG. 2) which lift the tape 14 from the slit 8.

FIG. 4 also shows that the rib 37b is backwardly offset beyond the outer flank 33 of the body 6. Likewise, rib 37a (FIG. 3) is equally offset. The two ribs 37a, 37b define a plane 34 which extends parallel to the outer flank 33, but is inwardly, that is as seen in FIG. 4, offset against the outer flank 33. The head 28 of the rib 27 fits against this plane 34, that is, extends upwardly to a distance less than that of the surface 33 or body 6.

The cover tape 14 is held at least at its end 17 with a hold-back lock 47. The lock 47 is formed by a leaf spring 49 which presses the tape 14 against a counter element 48. The leaf spring 49 prevents movement of the tape 48 outwardly, that is, in FIG. 5 towards the left, while permitting movement outwardly towards the right. The hold-back lock 47 permits automatic tensioning of the tape 14. Reference is made to application Ser. No. 08/566,793, filed Dec. 4, 1995, Schon, assigned to the Assignee of the present application (Attorney Docket 950595-shf; PA 21 USA).

OPERATION.

Let is be assumed that the unit is to be used as a linear motion transfer element which provides drive for the carriage 4 in longitudinal direction, as schematically shown by the arrow 3. The drive unit 13, via the drive transmitting element 12, e.g., a spindle or the like, drives the coupling unit 11 which, through the sensing and force transfer element 9, moves the carriage 4 in the respective direction, as shown by arrow 3, that is, in FIG. 1 towards the left or to the right.

The portions of the cover tape 14 outside of the carriage 4 are locked to the body 6, and thereby cover the slit 8. The lips 36, 37 of the cover tape 14 (FIG. 4) are seated on the rib 27. The lips 36, 37, in their quiescent position are not spread, or, if so, only very slightly. The cover tape 14, therefore, can be shifted in longitudinal direction with little friction, while being reliably retained on the body 6, and sealingly engages the body 6. This effectively protects the interior 7 against contamination by dust or any other contaminants.

The tape 14 is lifted in the region of the carriage 4 from the slit 8, and axially passed through the carriage 4. The locking elements 26, 35 are separated in this region. In a transitional region between the one in which the cover tape 14 engages the body 6, that is, locking elements 26, 35 are engaged, and the region in which the cover tape is lifted off—locking elements 26, 35 are separated, portions of the lips 36, 37 will be spread, that is, they are outwardly bent in undulating form.

Portions of the cover tape 14 in the direction of movement of the carriage 4 are lifted off locked position by the action of the roller 21 in the carriage 4, as the carriage 4 moves. The tape 14 is thus lifted off the guide body 6. During this lifting movement, the lips 36, 37, upon sliding off the rib 27, are slightly, and only momentarily spread. The roller 21 engages only the end surfaces of the longitudinal ribs 41, 42 of the cover tape 14, without touching the lips 36, 37. This protects the lips 36, 37, reducing wear, and protects them against deformation.

The longitudinal stiffening obtained by the longitudinal ribs 41, 42 of the cover tape has the effect that the cover tape is lifted from the guide body 6 as soon as it is beyond the roller 19 in the element 11, which holds the cover tape against the guide body 6.

The trailing end of the carriage 4 reseats the cover tape 14 as it passes the trailing roller 19, so that the cover tape will be resealed and relocked on the guide body 6. Lips 36, 37 will again be slightly spread and then snap over the head 28 of the rib or rail 27, and hold the cover tape securely on the body 6. The holding force results in a profiled elongated strip lock, on both sides, independently from each other. The interengaging, snap effect is the result of the lips 36, 37, forming a pair. The path through which force is to be applied is short and does not bridge the slit 8. The portion of the tape 14 which covers the slit 8, or spans the slit 8, therefore, is entirely free from engagement forces and can be formed to be soft, or flexible.

The force necessary to lift the tape 14 off the guide body 6, as well as to reseat the tape is small. The lips 36, 37, in combination with the rounded, headed ribs or rails 27a, 27b result in lateral automatic alignment or centering of the tape 14. A catchment, or engagement region, thus, is formed by the profiled lock arrangement, which is constituted by the coupling elements 26, 35, or, more specifically, the rib or rail 27 and the lips 36, 37. Any lateral offset or misalignment of the cover tape 14 in relation to the guide body 6, which would exceed the catchment region, is prevented by the outer longitudinal ribs 41a, 42b (FIG. 3) of the cover tape 14. These ribs engage against the respectively opposite flanks 32a, 32b and thus define the lateral position of the cover tape 14.

The beaded or headed rib or rail 27, engaged between the two longitudinal lips 36, 37, form a snap-in lock or reliably positioning, holding and sealing the tape against the body 6.

The termination of the guide body towards the outside can be smooth, especially when the profiled strip lock is located only laterally adjacent to longitudinal slit of the guide body 6, in suitable recesses or longitudinal grooves 25. It is desirable, to so dimension the recesses, grooves and respective ribs that the ribs 27 do not extend beyond the height of adjacent side surfaces defining the slit. This prevents damage to the shape of the rib or rail 27, and especially to the head 28.

Elongated profiled strip locks of this type can be used for long periods of time without any lubrication. Friction is small due to the small height of the interlocking projections and recesses forming the lock, so that wear and tear likewise is low. The body 6, which, preferably, is an aluminum extruded profiled strip, is preferably formed with the deep recess 31 forming a groove to collect dirt or other rubbed-off particles. This groove can readily be formed, since sufficient space is available is between the rib or rail 27 and the outer surface 33, the inner portion of which is defined by the surface 32. This space is suitably used to receive the stiffening and guide elements 41a, 42b on the tape 14.

The preferably longitudinal ribs, projecting from the cover tape and unitary therewith, are located at respective sides of the locking element formed by the tape. These longitudinal stiffening ribs, adjoined, preferably, by another stiffening rib 41b, for example at the right side (FIG. 4), provide for engagement surfaces by the rollers 21 and for additional stiffening. These longitudinal ribs, transversely to the extent of the tape 14, preferably extend farther away than the lips 36, 37 forming the lock. The ribs 41, 42 not only provide for stiffening in longitudinal direction, but also as an engagement surface upon transport, or protection upon rough handling. When the tape 14 is separated from the guide body 6 during operation, the rollers 21, or other elements which lift the tape 14 from the slit 8 can engage at the lower surfaces of these longitudinal ribs 41, 42, without engaging the lips 36, 37, and thus possibly damaging them or interfering with their slightly spreading movement. Thus, deformation or damage to the lips part of the locking arrangement is reliably prevented which, otherwise, might lead to premature failure of the cover band or tape.

Figure 5:
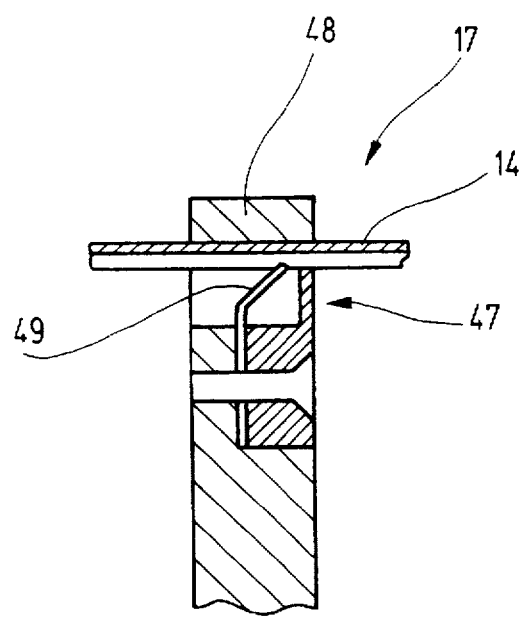
FIG. 5 is a schematic fragmentary view of an end portion to illustrate the end-holding of the cover tape to keep it in taut condition.

The tape holding arrangement, FIG. 5, is preferably used, and located at the ends of the slit to be covered. These band holding systems automatically accept excess length of band, if the band or tape has stretched, for example due to heating in use, or the like; automatic stretching and tightening of the tape or band is thus easily effected.

Various changes and modifications may be made within the scope of the inventive concept.

We claim:

1. Linear guided longitudinal displacement system comprising a movable guided element (9, 11) movable along a predetermined path;

an essentially tubular guide body (6) formed with a longitudinally extending slit (8) therethrough, through which a projecting portion (9) of the movable element (9, 11) projects;

a cover tape (14) to removably cover the slit (8), an elongated releasable locking arrangement (26, 35) formed of interlocking projection means (26) and recess means (35) located at the sides of the tape (14) and on said guide body (6), respectively, for releasably locking the tape (14) in position on said guide body (6)

the projection means (26) having elongated ribs, each formed with a rounded head portion (28) and neck portion (29) narrower than the cross section of said head portion, which neck portion is coupled to the guide body (6), said ribs being located laterally adjacent the slit (8);

the recess means (35) of the releasable locking arrangement including coupling recesses formed on said cover tape (14) shaped complementarily to said ribs (27) and dimensioned to receive the cross-sectional dimension of the head portion (28) of said projection means (26), said coupling recesses having coupling portions engaging over and beneath the head portion (28) of said projection means, which coupling recesses are formed by two projecting lips (36, 37), unitarily formed on the tape, spaced from each other and defining, therebetween, an elongated groove (38); and wherein said lips are resilient and dimensioned and constructed for resilient movement away from and towards each other, and form a part of the recess means (35) of said releasable locking arrangement, and provide for engagement over and beneath said rounded head portions (28) of said ribs (27).

2. The system of claim 1, wherein said rib (27) and the guide body (6) form a unitary element.

3. The system of claim 1, wherein the cross-section of the ribs (27) and of said projection means is uniform over their entire length.

4. The system of claim 1, wherein said cover tape (14) is essentially flat, and engages against both the outer sides of the guide body (6); and wherein the locking arrangements are provided on each side of the slit (8).

5. The system of claim 1, further including stiffening and guide ribs (41, 42) formed on the cover tape (14) at the side facing the guide body (6).

6. The system of claim 5, wherein the stiffening ribs (41, 42) are unitary with said cover tape (14) and define a pair of longitudinally extending projecting ribs between which the recess means of said (35) releasable locking arrangement are located; and wherein the longitudinal ribs extend farther from the cover tape (14) than the respective recess means (35) of said releasable locking arrangement and forming a coupling element (35) thereof, to protect said coupling element.

7. Linear guided longitudinal displacement system comprising a movable guided element (9, 11) movable along a predetermined path;

an essentially tubular guide body (6) formed with a longitudinally extending slit (8) therethrough, through which a projecting portion (9) of the movable element (9, 11) projects;

a cover tape (14) to removably cover the slit (8), an elongated releasable locking arrangement (26, 35) formed of interlocking projection means (26) and recess means (35) located at the sides of the tape (14) and on said guide body (6), respectively, for releasably locking the tape (14) in position on said guide body (6);

wherein the projection means (26) of the releasable locking arrangement comprises two elongated ribs (27a, 27b), each located laterally and spaced from the slit (8);

the recess means (35) of the releasable locking arrangement comprises recesses (25) formed in said guide body (6) adjacent the slit (8) within which the ribs (27) are located;

wherein, at the end of the recesses (25), the guide body is formed with a flank surface (33);

and wherein the ribs (27) are dimensionsed to be lower than the level of said flanks (33) on the guide body (6) in regions where said flanks (33) extend beyond the recesses.

8. The system of claim 7, wherein said ribs (27) and the guide body (6) form a unitary element.

9. The system of claim 7, wherein the ribs (27) have, each, a rounded head portion (28) and a neck portion narrower than the cross-section of said head portion, the neck portion being coupled to the guide body (6).

10. The system of claim 7, wherein the cross section of the rib (27) and of said projection means (26) is uniform over their entire length.

11. The system of claim 7, wherein said recess means (35) of said releasable locking arrangement (26, 35) and formed on said tape (14) define recesses which are shaped and dimensioned to receive the cross-sectional dimension of the head portion (28) of said projection means (26); and wherein said recess means (35) further include coupling portions engaging over and beneath the head portion (28) of said projection means (26) of the releasable locking arrangement.

12. The system of claim 11, wherein the tape is formed with two projecting lips (36, 37), spaced from each other and defining, therebetween, an elongated groove (35) forming said recess means;

and wherein said lips (36, 37) are dimensioned and constructed to permit resilient spreading thereof to form a portion of said releasable locking arrangement.

13. The system of claim 7, wherein said cover tape (14) is essentially flat, and engages against both of the outer sides of the guide body (6);

wherein the locking arrangements are provided on each side of the slit (8); and further including stiffening and guide ribs (41, 42) formed on the cover tape (14) at the side facing the guide body (6).

14. The system of claim 13, wherein the recess means (35) of the releasable locking arrangement comprises coupling recesses (35) formed on said cover tape (14) complementary to the elongated ribs (27a, 27b);

wherein the stiffening ribs (41, 42) are unitary with said cover tape (14) and define a pair of longitudinally extending projecting ribs between which the recess means of said (35) releasable locking arrangement are located; and wherein the stiffening ribs (41, 42) extend farther from the cover tape (14) than the depth of the respective recess means (35) of said releasable locking arrangement to protect the locking arrangement.

15. Linear guided longitudinal displacement system comprising a movable guided element (9, 11) movable along a predetermined path;

an essentially tubular guide body (6) formed with a longitudinally extending slit (8) therethrough, through which a projecting portion (9) of the movable element (9, 11) projects;

a cover tape (14) to removably cover the slit (8), an elongated releasable locking arrangement (26, 35) formed of interlocking projection means (26) and recess means (35) located at the sides of the tape (14) and on said guide body (6), respectively, for releasably locking the tape (14) in position on said guide body (6);

wherein the projection means (26) of the releasable locking arrangement comprises two elongated ribs (27a, 27b), each located laterally and spaced from the slit (8);

the recess means (35) of the releasable locking arrangement comprises recesses (25) formed in said guide body (6) adjacent the slit (8) within which the ribs (27) are located; and a separate depression (31) is formed in said recesses, and extending parallel to a flank (33) on the guide body for reception of at least one of debris and contaminants; and at least one stiffening rib (42) formed on the tape (14) and engaging into said depression (31).

16. The system of claim 15, wherein said ribs (27) and the guide body (6) form a unitary element.

17. The system of claim 15, wherein the ribs (27) have, each, a rounded head portion (28) and a neck portion narrower than the cross-section of said head portion, the neck portion being coupled to the guide body (6).

18. The system of claim 15, wherein said recess means (35) of said releasable locking arrangement (26, 35) and formed on said tape (14) define recesses which are shaped and dimensioned to receive the cross-sectional dimension of the head portion (28) of said projection means (26); and wherein said recess means (35) further include coupling portions engaging over and beneath the head portion (28) of said projection means (26) of the releasable locking arrangement.

19. The system of claim 18, wherein the tape is formed with two projecting lips (36, 37), spaced from each other and defining, therebetween, an elongated groove (35) forming said recess means;

and wherein said lips (36, 37) are dimensioned and constructed to permit resilient spreading thereof to form a portion of said releasable locking arrangement.

20. The system of claim 15, wherein said cover tape (14) is essentially flat, and engages against both of the outer sides of the guide body (6);

wherein the locking arrangements are provided on each side of the slit (8); and further including stiffening and guide ribs (41, 42) formed on the cover tape (14) at the side facing the guide body (6);

wherein the stiffening ribs (41, 42) extend farther from the cover tape (14) than the depth of the respective recess means (35) of said releasable locking arrangement to protect the locking arrangement.

* * * * *